(12) United States Patent
Wu

(10) Patent No.: US 9,307,382 B2
(45) Date of Patent: *Apr. 5, 2016

(54) METHOD OF MANAGING RECEPTION OF NATURAL DISASTER WARNING NOTIFICATION MESSAGES FOR A WIRELESS COMMUNICATION SYSTEM AND RELATED COMMUNICATION DEVICE

(71) Applicant: HTC Corporation, Taoyuan County (TW)

(72) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,000

(22) Filed: Apr. 25, 2013

(65) Prior Publication Data

US 2013/0231076 A1    Sep. 5, 2013

Related U.S. Application Data

(62) Division of application No. 12/346,847, filed on Dec. 31, 2008, now Pat. No. 8,433,280.

(60) Provisional application No. 61/087,986, filed on Aug. 11, 2008.

(51) Int. Cl.
*H04M 11/04* (2006.01)
*H04W 4/22* (2009.01)
(Continued)

(52) U.S. Cl.
CPC ............... *H04W 4/22* (2013.01); *H04H 20/59* (2013.01); *H04W 76/007* (2013.01); *H04W 72/005* (2013.01)

(58) Field of Classification Search
CPC ... H04W 4/22; H04W 76/007; H04W 72/005; H04H 20/59
USPC ........... 455/404.1, 404.2, 503, 418–420, 334, 455/343.1–343.5, 574; 370/270, 312, 389, 370/390, 432, 310, 311
See application file for complete search history.

(56) References Cited

U.S. PATENT DOCUMENTS 5,152,003 A    9/1992  Poch
5,722,065 A    2/1998  Ito
(Continued)

FOREIGN PATENT DOCUMENTS

CN    1801867 A    7/2006
CN    1893311 A    1/2007
(Continued)

OTHER PUBLICATIONS

3GPP TR 23.828 V1.0.0 (Jun. 2008): Technical Report 3rd Generation Partnership Project; Technical Specification Group Services and System Aspects; Earthquake and Tsunami Warning System Requirements and Solutions (ETWS); Solution Placeholder (Release 8).
(Continued)

*Primary Examiner* — Ronald Eisner
(74) *Attorney, Agent, or Firm* — Winston Hsu; Scott Margo

(57) ABSTRACT

A method of managing notification message reception corresponding to natural disaster warning for a user equipment of a wireless communication system includes managing the notification message reception according to configuration information broadcasted or paged by a network of the wireless communication system, wherein the configuration information broadcasted or paged by the network of the wireless communication system is existence information of a notification message sent by a serving cell.

8 Claims, 16 Drawing Sheets

(51) Int. Cl.
  *H04W 76/00* (2009.01)
  *H04H 20/59* (2008.01)
  *H04W 72/00* (2009.01)

(56) References Cited

U.S. PATENT DOCUMENTS

| | | | |
|---|---|---|---|
| 6,819,661 B2 | 11/2004 | Okajima | |
| 7,330,693 B1 * | 2/2008 | Goss | 455/3.01 |
| 7,672,280 B2 * | 3/2010 | Shim et al. | 370/338 |
| 7,787,868 B2 | 8/2010 | Park | |
| 7,916,687 B2 * | 3/2011 | Deshpande et al. | 370/328 |
| 8,433,280 B2 * | 4/2013 | Wu | H04W 4/22 455/404.1 |
| 8,731,511 B2 * | 5/2014 | Wu | H04W 4/22 340/517 |
| 8,805,318 B2 * | 8/2014 | Wu | H04W 4/22 455/404.1 |
| 2002/0034955 A1 | 3/2002 | Kobayashi | |
| 2004/0125766 A1 * | 7/2004 | Takano et al. | 370/328 |
| 2004/0180675 A1 * | 9/2004 | Choi et al. | 455/458 |
| 2004/0259568 A1 | 12/2004 | Patel | |
| 2005/0197096 A1 | 9/2005 | Yang | |
| 2005/0201321 A1 | 9/2005 | Sinnarajah | |
| 2006/0005219 A1 | 1/2006 | Owens | |
| 2006/0153342 A1 | 7/2006 | Sasaki | |
| 2007/0004334 A1 | 1/2007 | Tsuchiyama | |
| 2008/0056214 A1 | 3/2008 | Low | |
| 2008/0107392 A1 | 5/2008 | Grannan | |
| 2008/0108346 A1 | 5/2008 | Umatt | |
| 2008/0159234 A1 * | 7/2008 | Prakash et al. | 370/332 |
| 2008/0233939 A1 | 9/2008 | Kuo | |
| 2009/0213809 A1 | 8/2009 | Kwon | |
| 2010/0035575 A1 * | 2/2010 | Wu | H04W 4/22 455/404.1 |
| 2010/0075625 A1 * | 3/2010 | Wu | H04W 4/22 455/404.1 |
| 2010/0142491 A1 | 6/2010 | Dubreuille | |
| 2010/0173602 A1 * | 7/2010 | Muramatsu | 455/404.1 |
| 2010/0273444 A1 * | 10/2010 | Wu | H04W 4/22 455/404.1 |
| 2013/0231074 A1 * | 9/2013 | Wu | H04W 4/22 455/404.1 |
| 2013/0231075 A1 * | 9/2013 | Wu | H04W 4/22 455/404.1 |
| 2013/0231076 A1 * | 9/2013 | Wu | H04W 4/22 455/404.1 |
| 2013/0237177 A1 * | 9/2013 | Wu | H04W 4/22 455/404.1 |
| 2014/0206306 A1 * | 7/2014 | Wu | H04W 4/22 455/404.1 |

FOREIGN PATENT DOCUMENTS

| | | | | |
|---|---|---|---|---|
| EP | 1 739 868 | A1 | 1/2007 | |
| EP | 1755274 | A2 | 2/2007 | |
| EP | 1816766 | A2 | 8/2007 | |
| JP | 2005-332933 | * | 11/2005 | 455/404.1 |
| JP | EP 1950721 | A1 * | 7/2008 | H04H 1/00 |
| TW | 423233 | | 2/2001 | |
| WO | 2007039890 | A1 | 4/2007 | |
| WO | 2008115018 | A1 | 9/2008 | |

OTHER PUBLICATIONS

3GPP TS 25.419 V7.0.0 (Mar. 2006): 3rd Generation Partnership Project; Technical Specification Group RAN; UTRAN Iu-BC Interface: Service Area Broadcast Protocol (SABP) (Release 7).

3GPP TS 22.168 V8.1.0 "Earthquake and Tsunami Warning System", Jun. 2008.

3GPP: "3rd Generation Partnership Project; Technical Specification Group Services and System Aspects; Earthquake and Tsunami Warning System Requirements and Solutions (ETWS); Solution Placeholder (Release 8)", 3GPP 23.828 V0.1.0, Jan. 1, 2008, XP002540086.

Office action mailed on Jul. 1, 2011 for the China application No. 200910163370.6, filed Aug. 11, 2009, p. 1-3.

European patent application No. 11001776.1, European Search Report mailing date:May 3, 2011.

Office action mailed on Jun. 6, 2011 for the European application No. 11001776.1, p. 1-6.

European patent application No. 11001777.9, European application filed: Jun. 12, 2009, European Search Report mailing date: May 4, 2011.

Office action mailed on May 13, 2011 for the European applicatin No. 11001777.9, filing date Jun. 12, 2009, p. 1-6.

European paten application No. 11001778.7, European application filing date: Jun. 12, 2009, European Search Report mailing date: May 4, 2011.

Office action mailed on May 13, 2011 for the European application No. 11001778.7 filing date Jun. 12, 2009, p. 1-6.

European patent application No. 11003267.9, European Search Report mailing date: Aug. 19, 2011.

European patent application No. 12007396.0, European Search Report mailing date: Jan. 17, 2013.

3GPP TS 22.168 V9.0.0(Jun. 2008),"3rd Generation Partnership Project; Technical Specification Group Services and System Aspects; Earthquake and Tsunami Warning System (ETWS) requirements; Stagel (Release 9)", XP050361106, pp. 1-12.

Office action mailed on Jan. 30, 2013 for the Taiwan application No. 098126923, filed Aug. 11, 2009, p. 1-4.

Office action mailed on Jan. 17, 2014 for the U.S. Appl. No. 13/869,992, filed Apr. 25, 2013, p. 1-39.

Office action mailed on Jan. 17, 2014 for the U.S. Appl. No. 13/869,997, filed Apr. 25, 2013, p. 1-31.

Office action mailed on Jan. 6, 2014 for the China application No. 201210040725.4, filing date Aug. 11, 2009.

Office action mailed on Jul. 2, 2014 for the U.S. Appl. No. 13/870,953, filed Apr. 25, 2013, p. 1-26.

Office action mailed on Oct. 27, 2014 for the U.S. Appl. No. 13/869,997, filed Apr. 25, 2013, p. 1-33.

Dictionary.com, definition of "resource" printed on Feb. 2, 2015.

Office action mailed on Feb. 12, 2015 for the U.S. Appl. No. 13/869,992, filed Apr. 25, 2013, p. 1-37.

Office action mailed on Feb. 12, 2015 for the U.S. Appl. No. 13/869,997, filed Apr. 25, 2013, p. 1-38.

Dictionary.com, definition of "select" printed on Feb. 3, 2015.

Office action mailed on Feb. 12, 2015 for the U.S. Appl. No. 13/870,953, filed Apr. 25, 2013, p. 1-27.

Notice of Allowance mailed on Jun. 5, 2015 for the U.S. Appl. No. 13/870,953, filed Apr. 25, 2013, p. 1-20.

* cited by examiner

US 9,307,382 B2

METHOD OF MANAGING RECEPTION OF NATURAL DISASTER WARNING NOTIFICATION MESSAGES FOR A WIRELESS COMMUNICATION SYSTEM AND RELATED COMMUNICATION DEVICE

CROSS REFERENCE TO RELATED APPLICATIONS

This application is a division of U.S. application Ser. No. 12/346,847 filed on Dec. 31, 2008, which claims the benefit of U.S. Provisional Application No. 61/087,986, filed on Aug. 11, 2008.

BACKGROUND OF THE INVENTION

1. Field of the Invention

The present invention relates to a method for message transmission and related communication device in a wireless communication system, and more particularly, to a method and related communication device of the wireless communication system for managing notification message reception corresponding to natural disaster warning.

2. Description of the Prior Art

Earthquake and Tsunami Warning System (ETWS), set forth by the 3rd Generation Partnership Project (3GPP), is a natural disaster warning system for delivering Warning Notification simultaneously to many mobile users who should evacuate from approaching Earthquake or Tsunami. The ETWS consists of a PLMN (Public Land Mobile Network) that is capable to deliver Warning Notification and user equipments (UEs) that are capable to receive Warning Notification. The PLMN of the ETWS can be a GERAN (GSM/EDEG radio access network) of a 2G/2.5G GSM system, a UTRAN (UMTS radio access network) of a 3G UMTS system, or a EUTRAN (evolved-UTAN) of a long term evolution (LTE) system. Warning Notification Providers, which are usually run by local governments, produce Warning Notification to PLMN operator when an earthquake or tsunami event occurs.

Warning Notification is classified into two types depending on the purpose and urgency of the notification. The first type of Notification is called Primary Notification that delivers the most important information of the threat that is approaching to users (e.g. the imminent occurrence of Earthquake or Tsunami) and shall be delivered to the users as soon as possible. The second type of Notification is called Secondary Notification that delivers additional information, such as instructions on what to do or where to get help.

The Warning Notification Provider publishes a Primary Notification to PLMN and specifies the Notification Area where the Warning Notification is expected to be distributed when occurrence of a natural disaster is detected. Single or multiple Secondary Notifications are published following the Primary Notification. Finally, the Warning Notification Provider may request dissemination of notification to the PLMN to stop.

According to the prior art specification, the GERAN, the UTRAN, or the EUTRAN can use paging message to send a primary notification message since the primary notification message shall be delivered to the UE within 4 seconds. Alternatively, system information is utilized to send the primary notification message, and a paging message is then sent to notify UE to receive the primary notification message by receiving the broadcasted system information in a serving cell. As for delivery of a secondary notification message, Broadcast/Multicast Control (BMC) is used in the UTRAN, system information is used in the EUTRAN, and SMS-CB (Short Message Service-Cell Broadcast) is used in GERAN.

In the prior art, an ETWS capable UE in an idle mode starts to receive the secondary notification messages once one or more primary notification messages are received. However, the prior art neither specifies when the ETWS capable UE shall stop receiving the secondary notification messages if the warning notification providers stop delivering secondary notification messages nor specifies UE reactions to secondary notification message reception when cell selection or reselection, out of service, a RAT (Radio Access Technology) change, and other situation occurs. The main drawback is that the UE power drains if the UE cannot stop receiving secondary notification messages when no secondary notification message is delivered. Some examples are provided below to illustrate the drawback.

Issue 1 is described in this paragraph. The UE receives a paging message including a primary notification message from a warning notification provider in a GREAN cell. The UE starts to receive cell broadcast (CB) messages including secondary notification messages by listening to CBCH (Cell Broadcast Channel). After a while, the warning notification provider stops delivering the secondary notification messages. However, the UE still keeps receiving CB messages on CBCH.

Issue 2 is described in this paragraph. The UE receives a paging message including a primary notification message from a warning notification provider in a UTRAN cell. The UE starts to receive cell broadcast (CB) messages including secondary notification messages by listening to SCCPCH (Secondary Common Control Physical Channel). After a while, the warning notification provider stops delivering the secondary notification messages. However, the UE still keeps receiving CB messages on SCCPCH.

Issue 3 is described in this paragraph. The UE receives a paging message including a primary notification message from a warning notification provider in a EUTRAN cell. The UE starts to receive system information message including secondary notification messages. After a while, the warning notification provider stops delivering the secondary notification messages. However, the UE still keeps receiving system information.

Issue 4 is described in this paragraph. After the UE receives a primary notification message and then enters RR (radio resource) dedicated mode or a packet transfer mode in a GERAN cell or RRC (radio resource control) connected mode in a UTRAN/EUTRAN cell due to a MT (Mobile Terminated) call or web browsing, the UE cannot receive the secondary notification messages. When the UE enters the idle mode, the prior art does not specify if the UE continues to receive secondary notification messages or not. If the base station (GERAN/UTRAN/EUTRAN) has stopped sending secondary notification messages but the UE keeps secondary notification message reception, the UE power drains.

Issue 5 is described in this paragraph. After the UE receives a primary notification message in a cell with a certain RAT (RAT 1) and then suddenly detects out of service, the UE cannot receive the secondary notification messages. When the UE re-enters in service area in the same RAT (RAT 1), the prior art does not specify if the UE continues to receive secondary notification messages or not. If the base station (GERAN/UTRAN/EUTRAN) has stopped sending secondary notification messages but the UE keeps the secondary notification message reception, the UE power drains. When the UE re-enters in service area in a different RAT (RAT 2), the prior art does not specify if the UE continues to receive secondary notification messages or not. The secondary notification messages may not be sent in the RAT (RAT 2). As a result, the UE power drains since the UE keeps receiving secondary notification messages.

Issue 6 is described in this paragraph. After the UE receives a primary notification message in a cell and then reselects to another cell before starting to receive secondary notification messages, the prior art not specify if the UE continues to receive secondary notification messages or not. If the reselected cell belongs to a different RAT, the secondary notification messages may not be sent. If the UE keeps receiving secondary notification messages, the UE power drains.

Issue 7 is described in this paragraph. The UE may miss primary notification messages (e.g. paging messages) due to cell reselection or a short interruption of service (e.g. entering elevator). In this case, the UE will not receive secondary notification messages after reselecting or re-entering the service area until the UE receives a primary notification message.

Issue 8 is described in this paragraph. The prior art does not specify how the warning notification provider only sends primary notification messages, i.e. no secondary notification message.

Issue 9 is described in this paragraph. The UE may not be able to receive paging and secondary notification messages simultaneously. For example, the reception of paging message has higher priority than normal CB (cell broadcast) messages in the GERAN/UTRAN. However, this specification may not be proper for CB messages including secondary notification messages because the secondary notification messages may contain more important information.

Issue 10 is described in this paragraph. A UE camps on a cell that the system information does not have configuration for secondary notification message. The warning notification provider requests to activate ETWS and provides primary notification and secondary notification messages. The base station controlling the cell changes system information to include configuration for UE to receive secondary notification messages. The base station sends a system information change notification message to notify UEs system information changed. The UE receives the changed system information. The base station sends a primary notification message. The UE receives a primary notification message and then receives secondary notification messages. This delivery is not efficient because the base station has to send a system information change notification message in advance of the primary notification message.

Issue 11 is described in this paragraph. The LTE base station, i.e. eNB, may not have good support for ETWS in the first launch. If paging is used to send primary notification messages, the primary notification message is easily introduced into a paging message by doing a little modification to the paging message. However, it needs more effort to support secondary notification messages. Another example is that LTE cells with a small bandwidth (e.g. 1.25 MHz) may have insufficient resources to send the secondary notification messages.

SUMMARY OF THE INVENTION

An embodiment of the present invention further discloses a method of managing notification message reception corresponding to natural disaster warning for a UE of a wireless communication system. The method includes managing the notification message reception according to configuration information broadcasted or paged by a network of the wireless communication system, wherein the configuration information broadcasted or paged by the network of the wireless communication system is existence information of a notification message sent by a serving cell.

An embodiment of the present invention further discloses a communication device of a wireless communication system for managing notification message reception corresponding to natural disaster warning. The communication device comprises a processing means for executing a program, and a storage unit coupled to the processing means for storing the program; wherein the program instructs the processing means to perform the following steps: managing the notification message reception according to configuration information broadcasted or paged by a network of the wireless communication system, wherein the configuration information broadcasted or paged by the network of the wireless communication system is existence information of a notification message sent by a serving cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
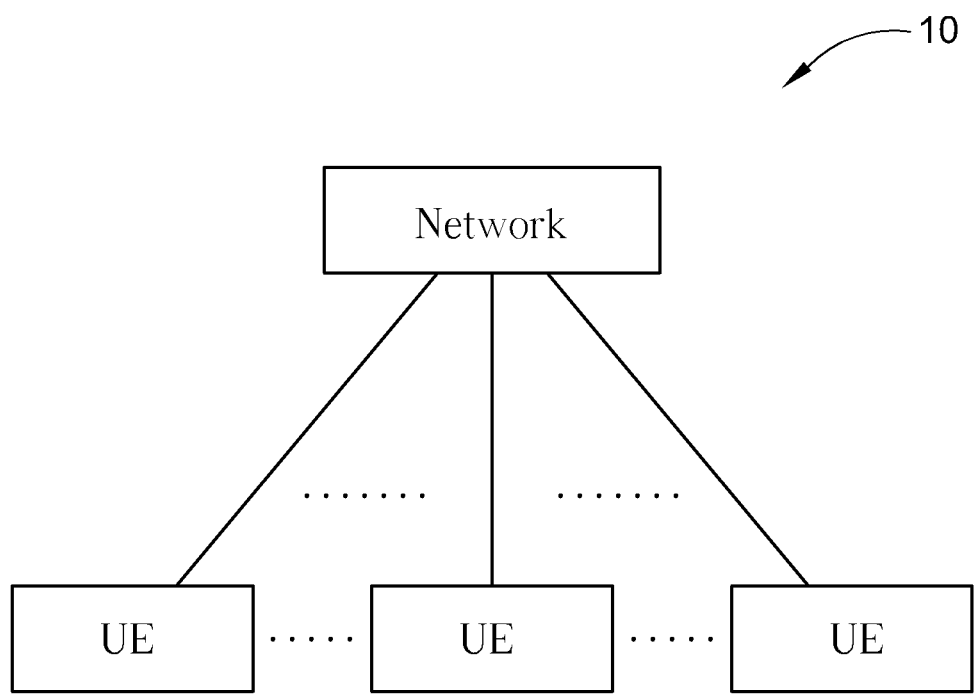
FIG. 1 is a schematic diagram of a wireless communication system.

Please refer to FIG. 1, which illustrates a schematic diagram of a wireless communication system 10 according to an embodiment of the present invention. The wireless communication system 10 is an Earthquake and Tsunami Warning System based on a 2.5G/3G (Generation) mobile telecommunication system, an LTE (long-term evolution) system or other mobile communication systems, and is briefly composed of a network and a plurality of UEs. In FIG. 1, the network and the UEs are simply utilized for illustrating the structure of the wireless communication system 10. Practically, the network may be a public land mobile network (PLMN), such as a GERAN (GSM/EDEG radio access network) of a 2G/2.5G GSM system, a UTRAN (UMTS radio access network) of a 3G UMTS system, or a EUTRAN (evolved-UTAN) of the LTE system, comprising a plurality of base stations (i.e. BTSs, Node-Bs, or eNBs), network controllers (i.e. Base Station Controllers or Radio Network Controllers) and so on according to actual demands. The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
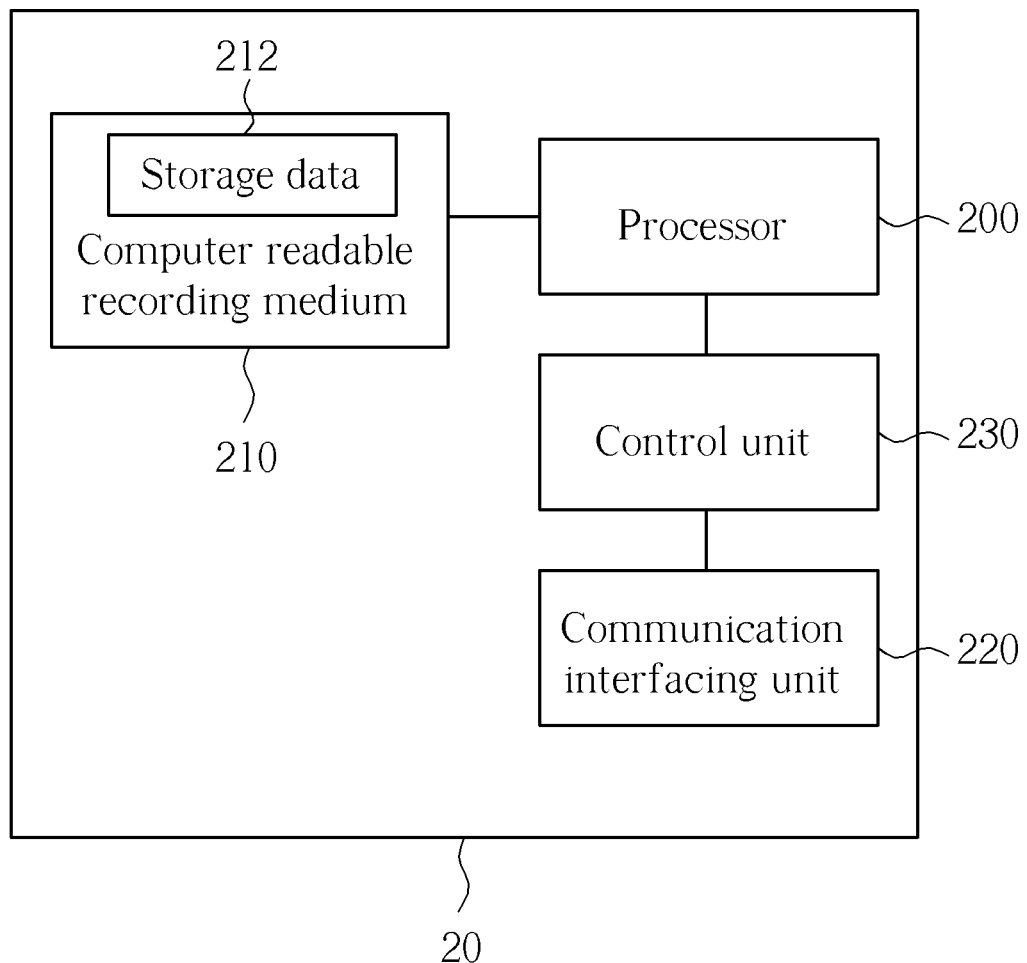
FIG. 2 is a schematic diagram of a communication device according to embodiments of the present invention.

Please refer to FIG. 2, which illustrates a schematic diagram of a communication device 20 according to embodiments of the present invention. The communication device 20 is utilized for realizing the network or the UEs shown in FIG. 1 and includes a processor 200, a computer readable recording medium 210, a communication interfacing unit 220 and a control unit 230. The computer readable recording medium 210 is any data storage device that stores storage data 212, including program code and corresponding parameters (i.e. a timer or a flag if necessary), and the storage data 212 is thereafter read and processed by the processor 200. Examples of the computer readable recording medium include read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processed results of the process 200. The communication interfacing unit 220 is responsible for exchanging wireless signals with a peer communication device.

To facilitate emergency information delivery for a natural disaster (i.e. an earthquake or a tsunami), the network of the wireless communication system 10 receives a Primary Notification and one or more following Secondary Notifications published by a Warning Notification Provider and thereby generates Primary Notification message and the Secondary Notification messages delivered to the UE in page type message or system information form. The UE has to receive one or more secondary notification messages when a primary notification message is received. In addition, the network can send configuration information to the UE in a broadcast (e.g. system information) or paging (e.g. paging messages) way.

To avoid a power waste in notification message reception and a missing of notification messages, the following processes are provided a user equipment of a wireless communication system to managing the notification message reception (e.g. secondary notification message reception or related configuration information reception) according to a reception property of the notification message reception, configuration information broadcasted or paged by a network of the wireless communication system, or a connection state of the user equipment.

Figure 16:
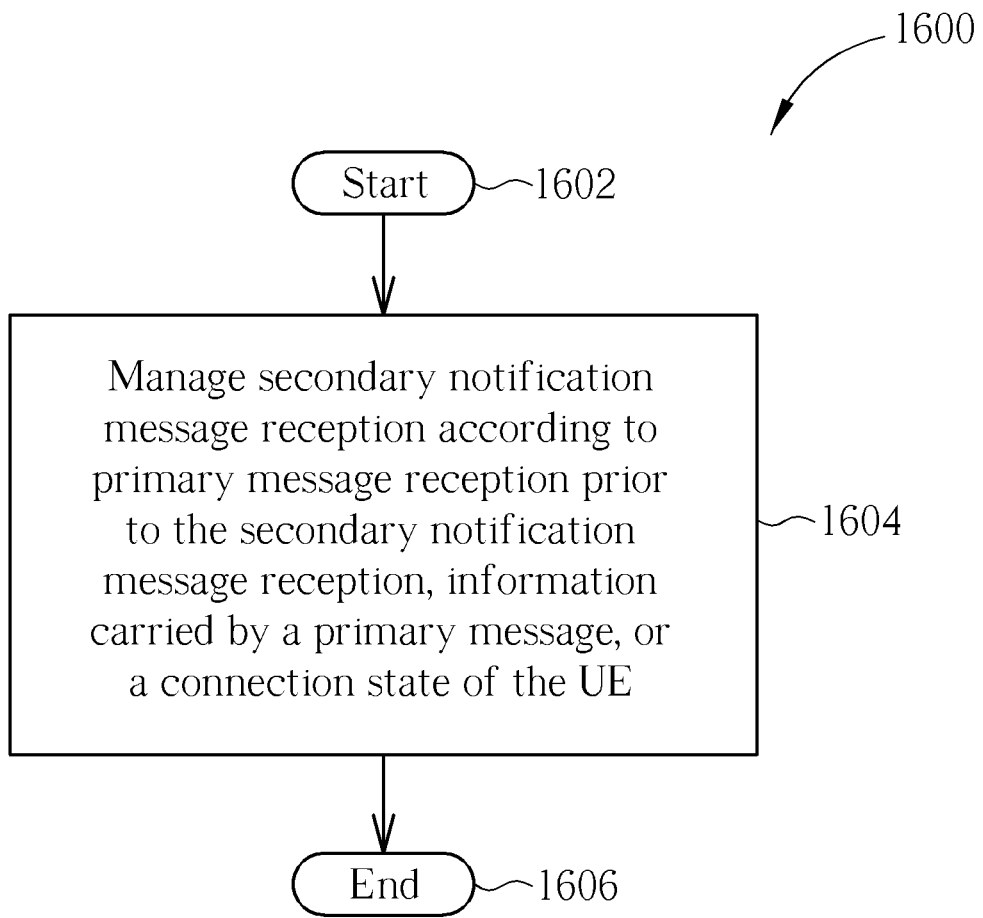
FIG. 16 is a flowchart of a process according to an embodiment of the present invention.

Please refer to FIG. 16, which illustrates a flowchart of a process 1600 according to an embodiment of the present invention. The process 1600 is utilized for managing the secondary notification message reception of a UE in a wireless communication system and can be compiled into the program code of the storage data 212 stored in the computer readable recording medium 210. The process 1600 includes the following steps:

Step 1602: Start.

Step 1604: Manage secondary notification message reception according to primary message reception prior to the secondary notification message reception, information carried by a primary message, or a connection state of the UE.

Step 1606: End.

According to the process 1600, the secondary notification message reception of the UE is managed according to the primary message reception, information carried by the primary message, or a connection state of the UE. For example, the UE stops the secondary notification message reception when the primary message does not include any information about the secondary notification message delivery. On the contrary, the UE begins or resumes the secondary notification message reception when the primary message includes information about the secondary notification message delivery.

The connection state of the UE includes the connection state of the UE corresponding to radio resource control (e.g. a packet transfer mode), the connection state of the UE corresponding to a radio access technology (RAT), and the connection state of the UE corresponding to cell selection or cell reselection.

Through the process 1600, the UE neither wastes power on the secondary notification message reception nor misses any secondary notification message.

For further specific explanation of the concept of the present invention, the following embodiments describe management of the secondary notification message reception when the UE meets different situations.

Figure 3:
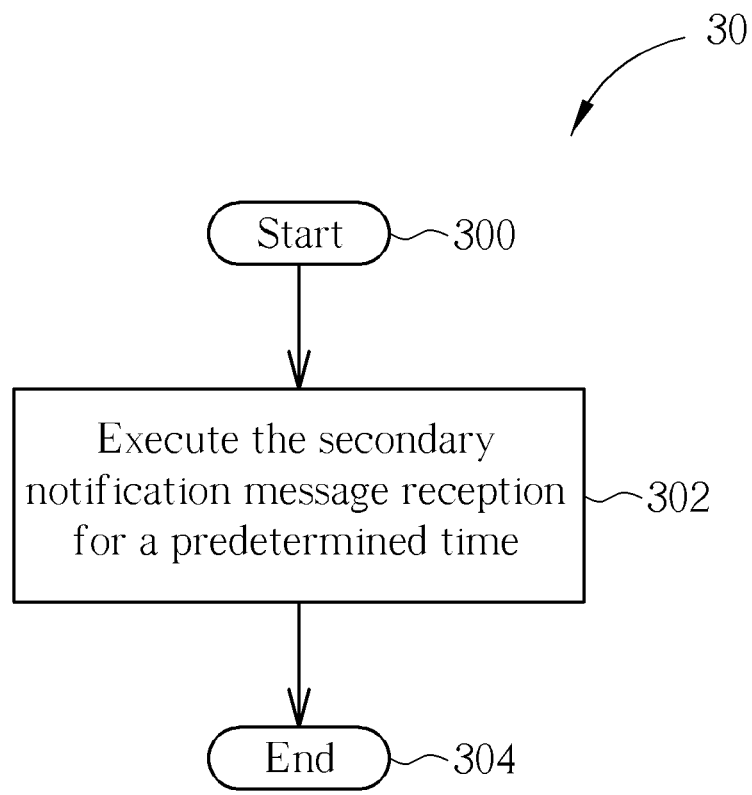
FIG. 3 is a flowchart of a process according to an embodiment of the present invention.

The reception properties of the notification message reception can be a predetermined time of the notification message reception. Please refer to FIG. 3, which illustrates a flowchart of a process 30 according to an embodiment of the present invention. The process 30 is utilized for managing the secondary notification message reception for a UE of a wireless communication system and can be compiled into the program code of the storage data 212 stored in the computer readable recording medium 210. The process 30 includes the following steps:

Step 300: Start.

Step 302: Execute the secondary notification message reception for a predetermined time.

Step 304: End.

According to the process 30, the present invention specifies the UE to execute the secondary notification message reception for a predetermined time. In other words, the UE stops the secondary notification message reception when the predetermined time expires. Preferably, the UE further receives an indication message, which indicates continuation or stop of the secondary notification message reception, from the network and thereby determines whether to continue or stop the notification message according to the indication message.

Preferably, the predetermined time is 50 s. A timer stored in the UE (i.e. the storage data 212) is configured by the UE or the network for setting the predetermined time. The UE starts the timer when the primary notification message, a complete secondary notification message, or part of a secondary notification message is received. The timer value is preferably sent in a primary notification message, a secondary notification message, a complete secondary notification message, part of the secondary notification message or system information.

The process 30 can solve the issues 1-6 of the prior art and thereby prevent the UE from wasting power on the secondary notification message reception when no more secondary notification message may be delivered to the UE.

Figure 4:
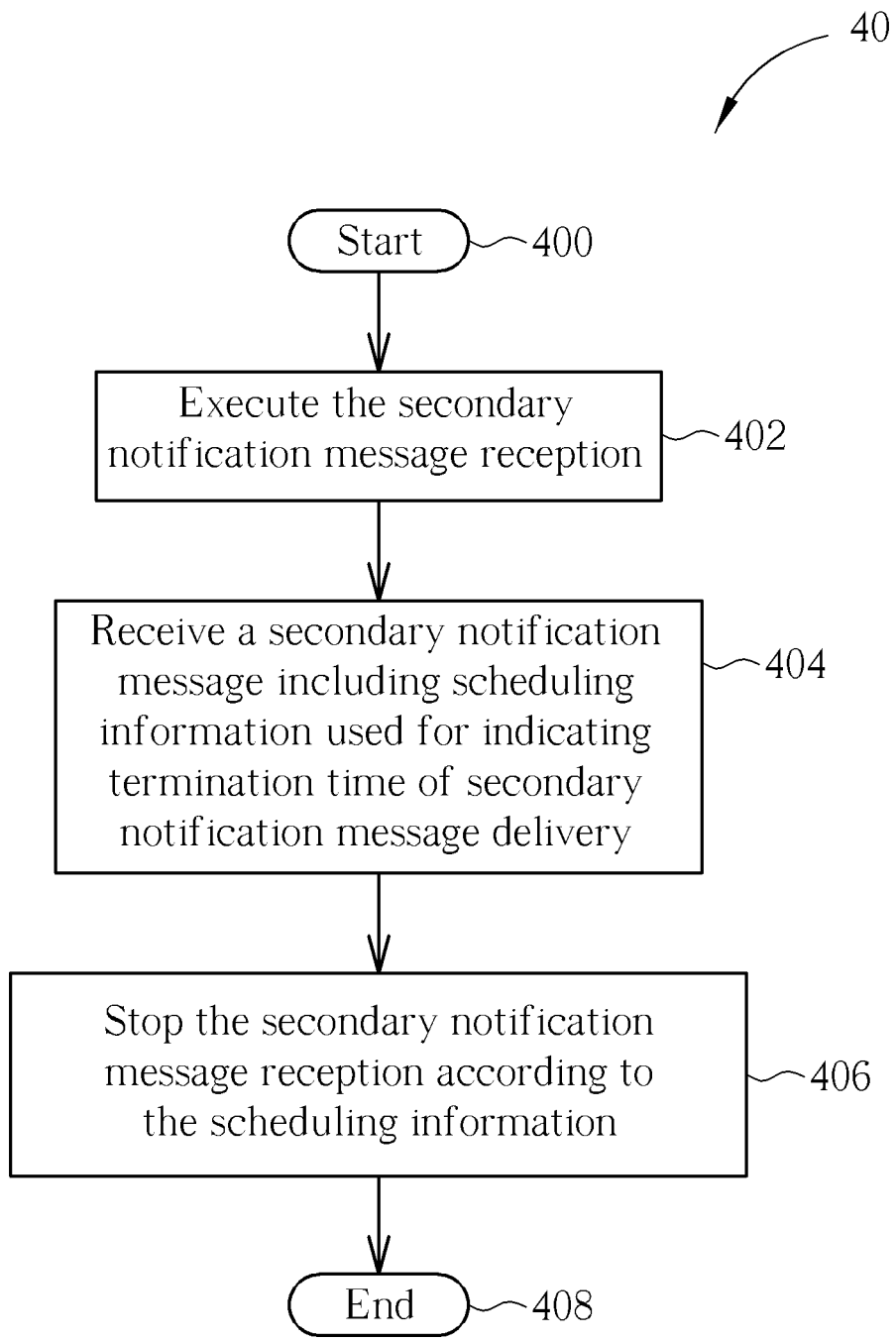
FIG. 4 is a flowchart of a process according to an embodiment of the present invention.

The configuration information broadcasted or paged by the network of the wireless communication system can be a notification message including scheduling information used for indicating a termination time of notification message delivery. Please refer to FIG. 4, which illustrates a flowchart of a process 40 according to an embodiment of the present invention. The process 40 is utilized for managing the secondary notification message reception for a UE of a wireless communication system and can be compiled into the program code of the storage data 212. The process 40 includes the following steps:

Step 400: Start.

Step 402: Execute the secondary notification message reception.

Step 404: Receive a secondary notification message including scheduling information used for indicating termination time of secondary notification message delivery.

Step 406: Stop the secondary notification message reception according to the scheduling information.

Step 408: End.

According to the process 40, the UE executes the secondary notification message reception, preferably after the primary notification message is received. When receiving a secondary notification message including scheduling information, the UE stops the secondary notification message reception according to the termination time of the scheduling information. The process 40 can solve the issues 1-3 of the prior art.

Preferably, in the process 40, the scheduling information is included in one of a plurality of secondary notification messages generated by the network.

Figure 5:
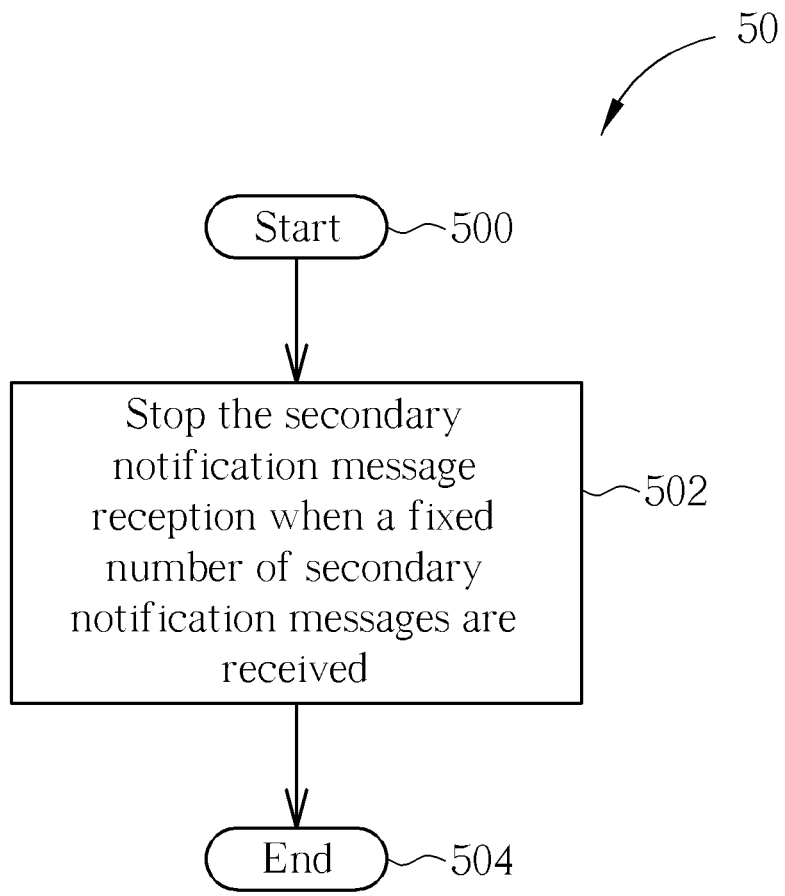
FIG. 5 is a flowchart of a process according to an embodiment of the present invention.

The reception properties of the notification message reception can be a fixed number of received secondary notification messages. Please refer to FIG. 5, which illustrates a flowchart of a process 50 according to an embodiment of the present invention. The process 50 is utilized for managing the secondary notification message reception for a UE of a wireless communication system and can be compiled into the program code of the storage data 212. The process 50 includes the following steps:

Step 500: Start.

Step 502: Stop the secondary notification message reception when a fixed number of secondary notification messages are received.

Step 504: End.

According to the process 50, the present invention specifies the UE to stop the secondary notification message reception when a fixed number of secondary notification messages are received. The process 50 can solve the issues 1-6 of the prior art.

Figure 6:
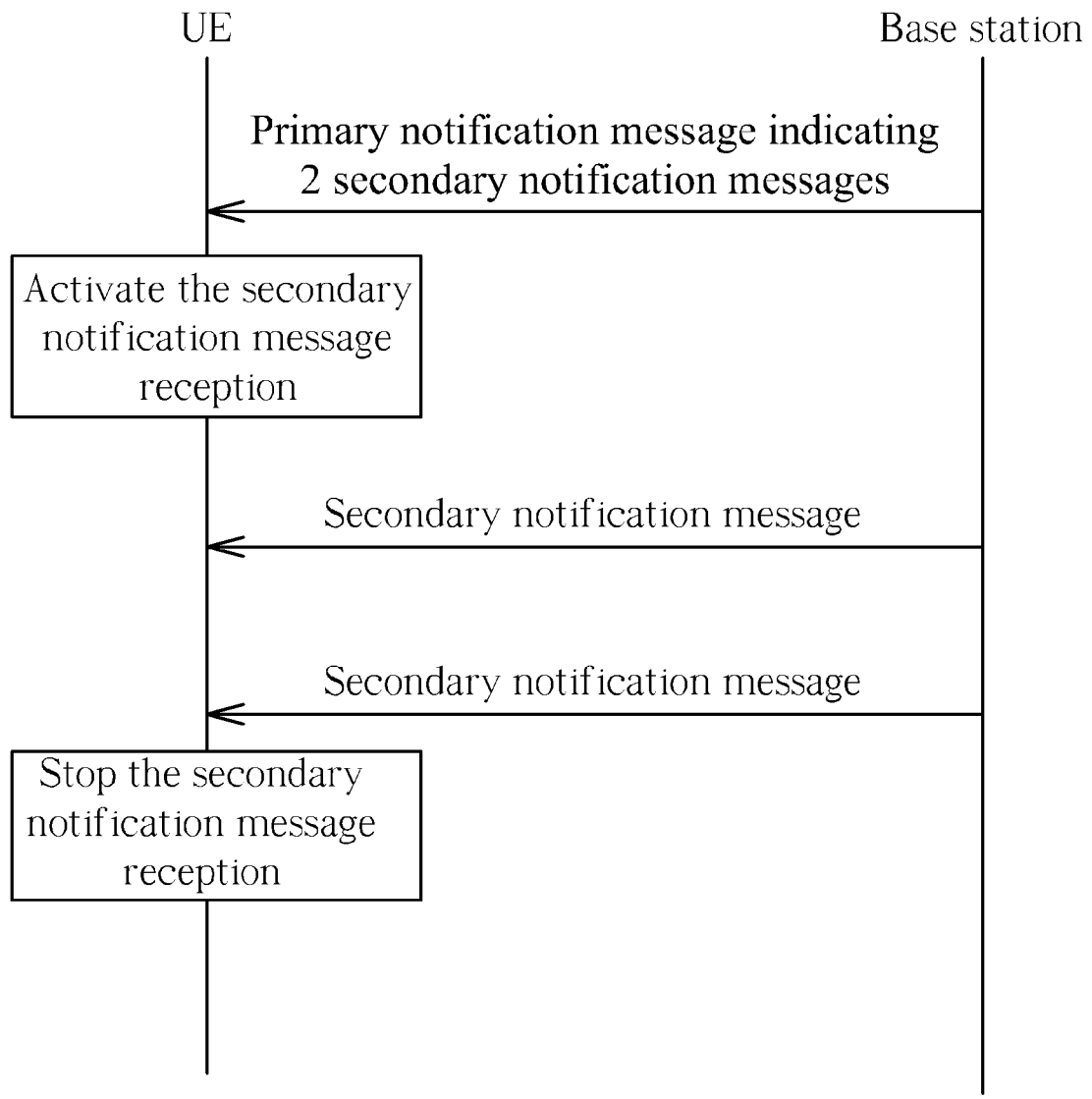
FIG. 6 is a sequence diagram between a UE and a base station according to FIG. 5.

Preferably, the configuration of the fixed number is included in a primary notification message. Please refer to FIG. 6, which illustrates a sequence diagram of a UE and a base station of a network according to the process 50. In FIG. 6, the UE receives the primary notification message from the base station and then retrieves a number of 2 corresponding to the secondary notification message reception from the primary notification message. Then, the UE stops the secondary notification message reception when two consecutive secondary notification messages are received.

Alternatively, the fixed number is predetermined in the UE before the notification message reception is executed. For example, if the fixed number is set to 3, the UE automatically starts to receive three secondary notification messages when a primary notification message is received.

Figure 7:
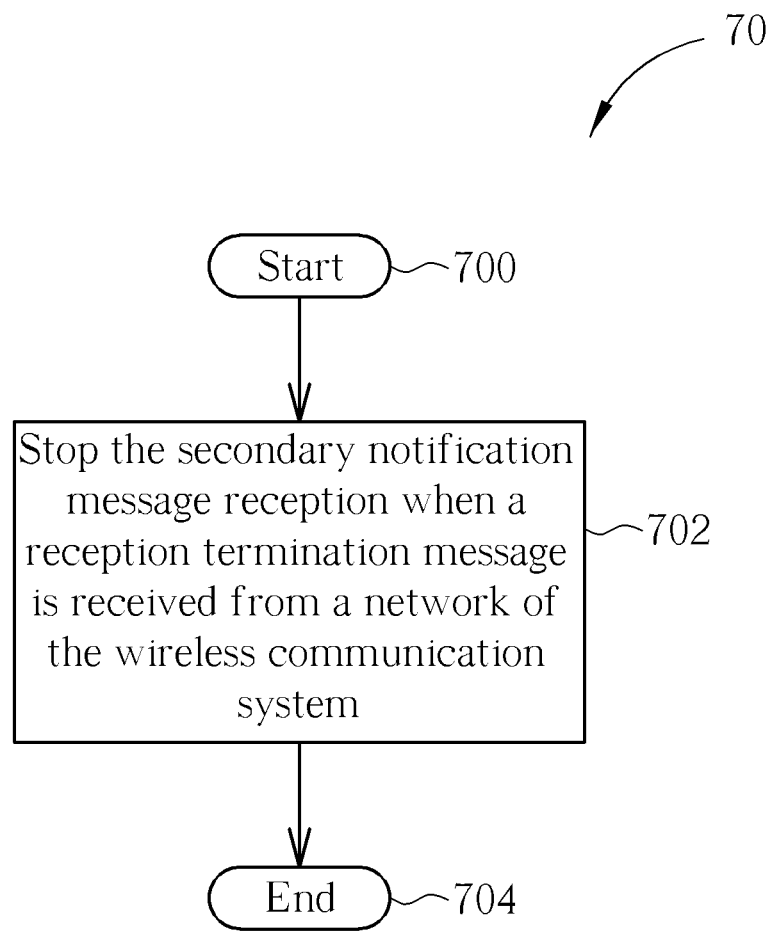
FIG. 7 is a flowchart of a process according to an embodiment of the present invention.

Please refer to FIG. 7, which illustrates a flowchart of a process 70 according to an embodiment of the present invention. The process 70 is utilized for managing the secondary notification message reception for a UE of a wireless communication system and can be compiled into the program code of the storage data 212. The process 70 includes the following steps:

Step 700: Start.

Step 702: Stop the secondary notification message reception when a reception termination message is received from a network of the wireless communication system.

Step 704: End.

According to the process 70, the UE stops the secondary notification message reception when the reception termination message is received. In other words, the network controls the UE to stop the secondary notification message reception via the reception termination message. The process 70 can solve the issues 1-3 of the prior art.

Preferably, the reception termination message is a paging message with specific content. The UE immediately stops the secondary notification message reception when receiving a paging message with such content. Alternatively, the reception termination message is a secondary notification message including reception termination information indicating the UE whether to continue the secondary notification message reception or not.

Figure 8:
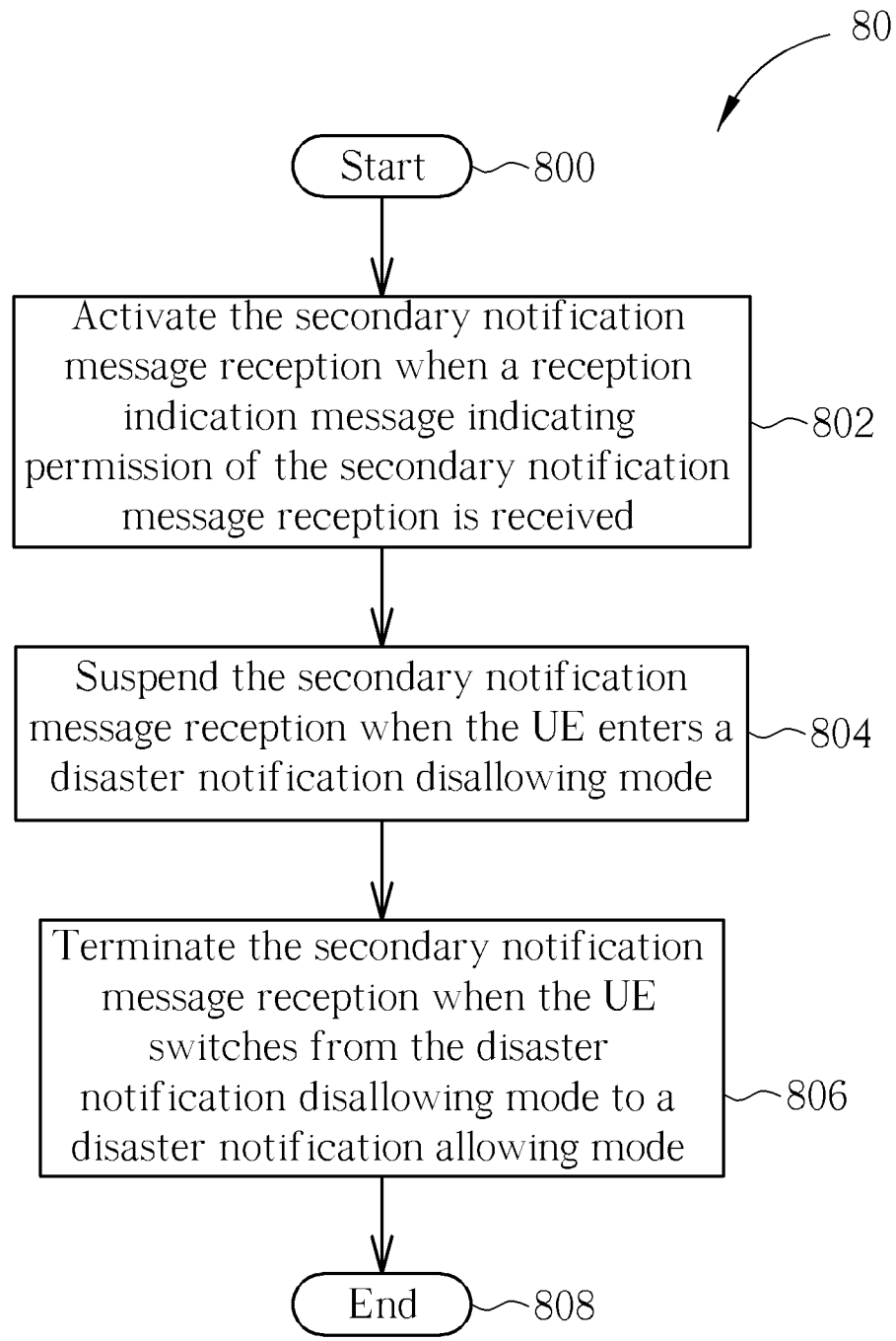
FIG. 8 is a flowchart of a process according to an embodiment of the present invention.

Please refer to FIG. 8, which illustrates a flowchart of a process 80 according to an embodiment of the present invention. The process 80 is utilized for managing the secondary notification message reception for a UE of a wireless communication system and can be compiled into the program code of the storage data 212. The process 80 includes the following steps:

Step 800: Start.

Step 802: Activate the secondary notification message reception when a reception indication message indicating permission of the secondary notification message reception is received.

Step 804: Suspend the secondary notification message reception when the UE enters a disaster notification disallowing mode.

Step 806: Terminate the secondary notification message reception when the UE switches from the disaster notification disallowing mode to a disaster notification allowing mode.

Step 808: End.

According to the process 80, the UE activates the secondary notification message reception when the reception indication message sent by the network is received. Before completion of the secondary notification message reception, the UE suspends the secondary notification message reception when entering the disaster notification disallowing mode where secondary notification messages are not allowed to be sent. The embodiment of the present invention specifies that the UE terminates the secondary notification message reception when switching from the disaster notification disallowing mode to a disaster notification allowing mode. Preferably, the reception indication message is a primary notification message indicating that the UE is allowed to receive the secondary notification messages.

Preferably, the UE switches from the disaster notification disallowing mode to the disaster notification allowing mode when a mode change message sent by the network is received. In this situation, a reception termination indicator is preferably included in the mode change message.

Preferably, the disaster notification allowing mode is an idle mode. Under different radio access networks, the disaster notification disallowing modes are different. For example, the disaster notification disallowing mode is a radio resource (RR) dedicated mode or a packet transfer mode when the UE operates under the GERAN. The disaster notification disallowing mode is a CELL DCH state or a CELL FACH state for the UTRAN. The disaster notification disallowing mode is a radio resource control (RRC) connected mode for the EUTRAN. As can be seen from the above, the process 80 can solve the issue 4 of the prior art.

When the UE operates under the GERAN and performs Steps 802 and 804, where the UE suspends the secondary notification message reception when entering the packet transfer mode due to a specific event (i.e. web browsing), another embodiment process of the present invention is provided as follows. The Packet transfer mode is information transfer by means of packet transmission and packet switching, thereby permitting dynamic sharing of network resources among many connections.

Figure 9:
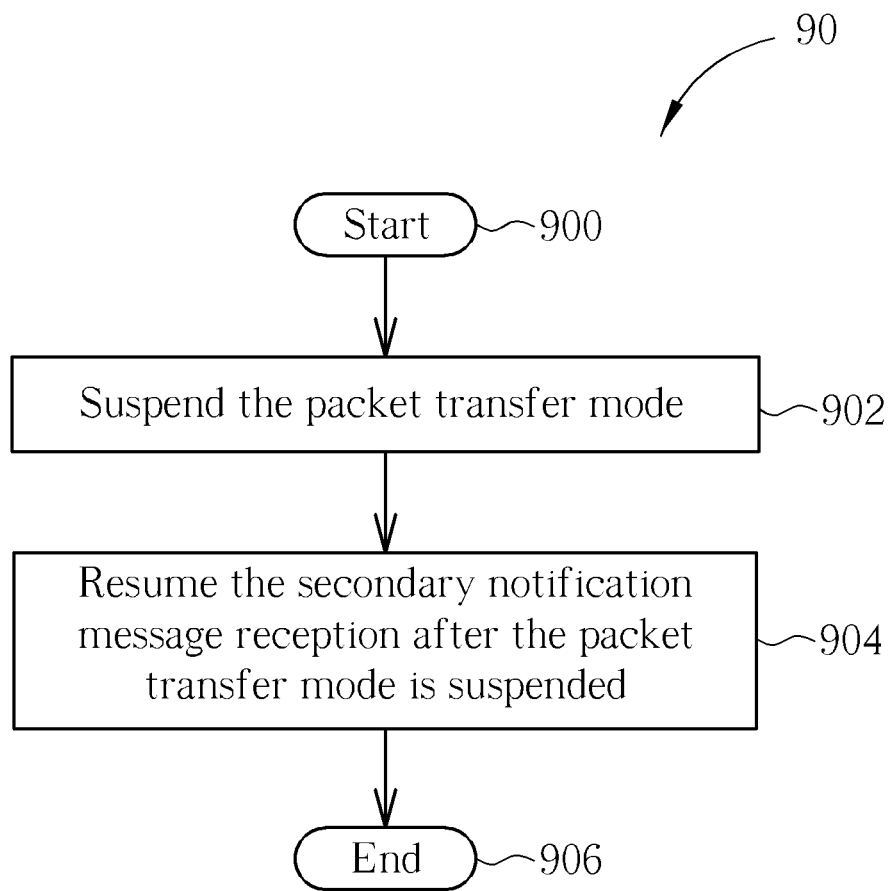
FIG. 9 is a flowchart of a process according to an embodiment of the present invention.

Please refer to FIG. 9, which illustrates a flowchart of a process 90 according to an embodiment of the present invention. The process 90 is utilized for managing the secondary notification message reception for a UE of a wireless communication system and can be compiled into the program code of the storage data 212. The process 90 includes the following steps:

Step 900: Start.
Step 902: Suspend the packet transfer mode.
Step 904: Resume the secondary notification message reception after the packet transfer mode is suspended.
Step 906: End.

According to the process 90, the UE suspends the packet transfer mode after entering the packet transfer mode, and then resumes the secondary notification message reception after the packet transfer mode is suspended.

In addition, the UE can further resume the packet transfer mode when the notification message reception is not scheduled. Unscheduled notification message reception described herein means that the network discontinuously sends the notification messages to the UE. For example, the UE has to enter the packet transfer mode when activating a web browsing service and then suspends the packet transfer mode for the secondary notification message reception. On the other hand, the network schedules discontinuous transmission for the secondary notification message. Each transmission can include a complete secondary notification message or part of the secondary notification message. Due to discontinuous transmission, system resources of the UE are not used for the notification message reception between two consecutive transmissions for the secondary notification message. The periods between the consecutive transmissions are seen as that the notification message reception is not scheduled. The UE resumes the packet transfer mode for unfinished reception of the web browsing service during the periods.

Figure 10:
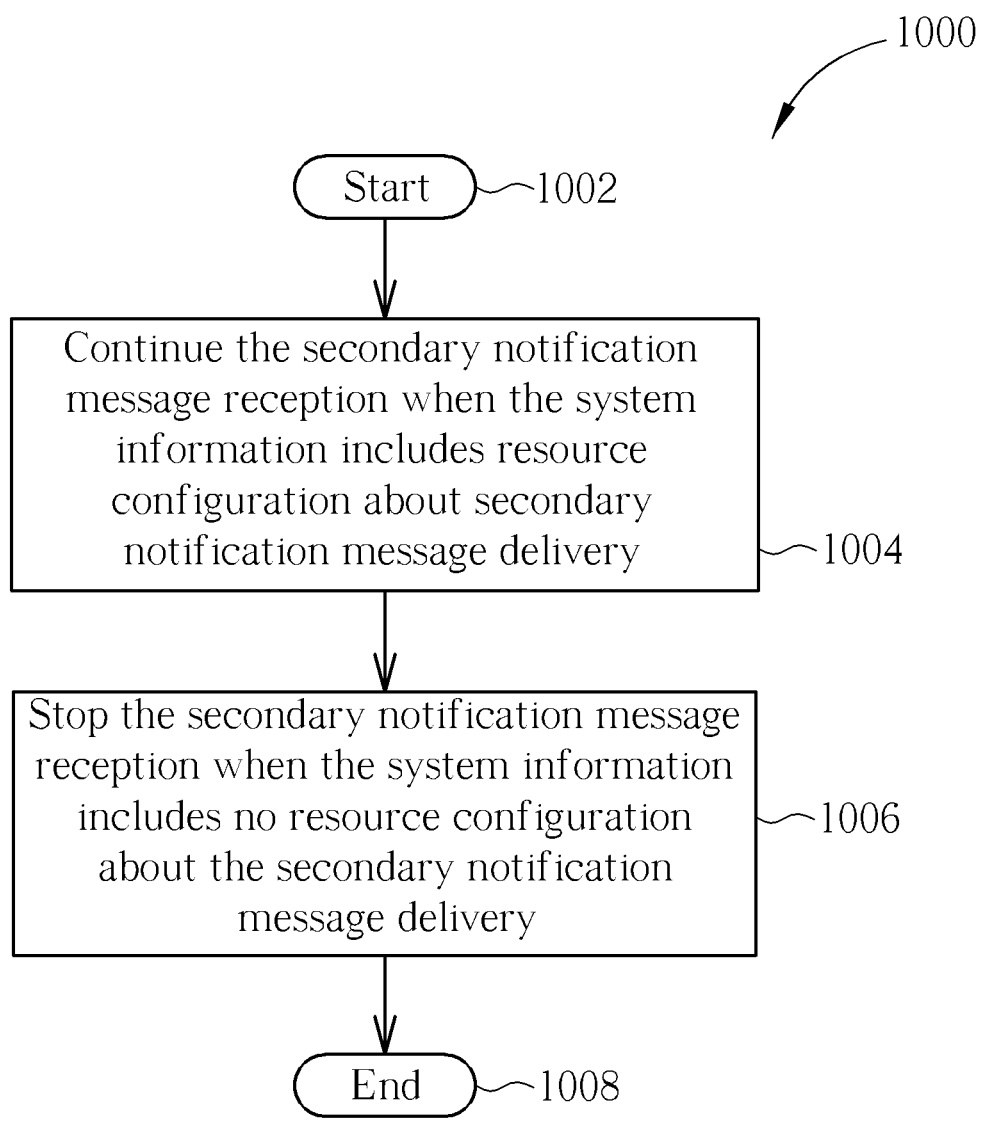
FIG. 10 is a flowchart of a process according to an embodiment of the present invention.

As can be seen from the above, the UE activates the secondary notification message reception when the primary notification message as well as the abovementioned reception indication message is received. During the secondary notification message reception, the UE may select or reselect a cell due to bad communication quality with the current serving cell or better communication quality with the selected cell. The UE receives system information corresponding to the selected cell after cell selection or reselection is performed. In this situation, the embodiment of the present invention provides reception managing program code in the storage data 212 to prevent power waste. Please refer to FIG. 10, which illustrates a flowchart of a process 1000 according to an embodiment of the present invention. The process 1000 is utilized for managing the secondary notification message reception for a UE of a wireless communication system and can be compiled into the reception managing program code. The process 1000 includes the following steps:

Step 1002: Start.
Step 1004: Continue the secondary notification message reception when the system information includes resource configuration about secondary notification message delivery.
Step 1006: Stop the secondary notification message reception when the system information includes no resource configuration about the secondary notification message delivery.
Step 1008: End.

According to the process 1000, the UE determines execution of the secondary notification message reception according to the system information of the selected cell. When the system information includes the resource configuration about secondary notification message delivery, this means that secondary notification message delivery is supported in the selected cell. As a result, the UE continues the secondary notification message reception. On the contrary, the UE stops the secondary notification message reception since the system information without the abovementioned resource configuration indicates that the selected cell does not support the secondary notification message delivery.

Preferably, the UE keeps receiving system information during the activation of secondary notification message reception or receives the system information when a system information change message is received.

In addition, the UE can further start a timer corresponding to the secondary notification message reception when the system information includes the resource configuration, and stops the secondary notification message reception at expiration of the timer when none of secondary notification message is received before the timer expires. In addition, the UE restarts the timer when a primary notification message, a complete notification message or part of a notification message is received.

The process 1000 provides a criteria for the UE using the secondary notification message reception to deal with the cell selection and reselection and thus can solve the issues 5 and 6 of the prior art.

Figure 11:
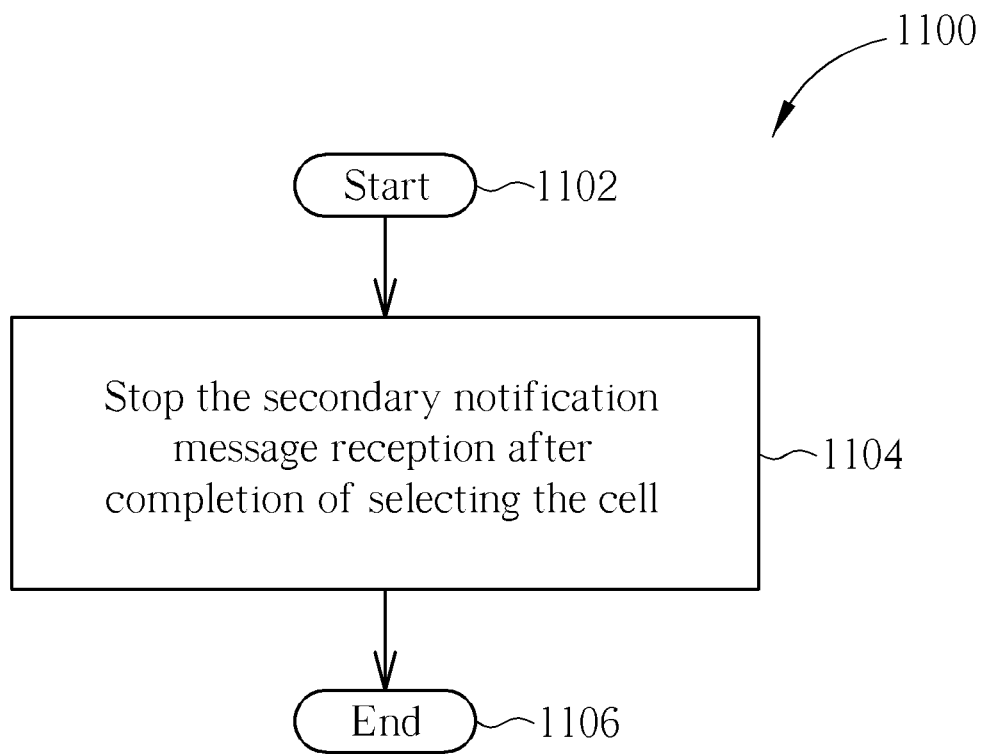
FIG. 11 is a flowchart of a process according to an embodiment of the present invention.

In addition to the process 1000, another embodiment described as below is provided to deal with the cell selection and reselection. Please refer to FIG. 11, which illustrates a flowchart of a process 1100 according to an embodiment of the present invention. The process 1100 is utilized for managing the secondary notification message reception for a UE of a wireless communication system and can be compiled into the reception managing program code. The process 1100 includes the following steps:

Step 1102: Start.
Step 1104: Stop the secondary notification message reception after completion of selecting the cell.
Step 1106: End.

According to the process 1100, the embodiment of the present invention specifies that the UE stops the secondary notification message reception after the completion of selecting the cell, irrespective of whether the secondary notification message delivery is supported in the selected cell. The process 1100 can solve the issues 5 and 6 of the prior art as well.

Figure 12:
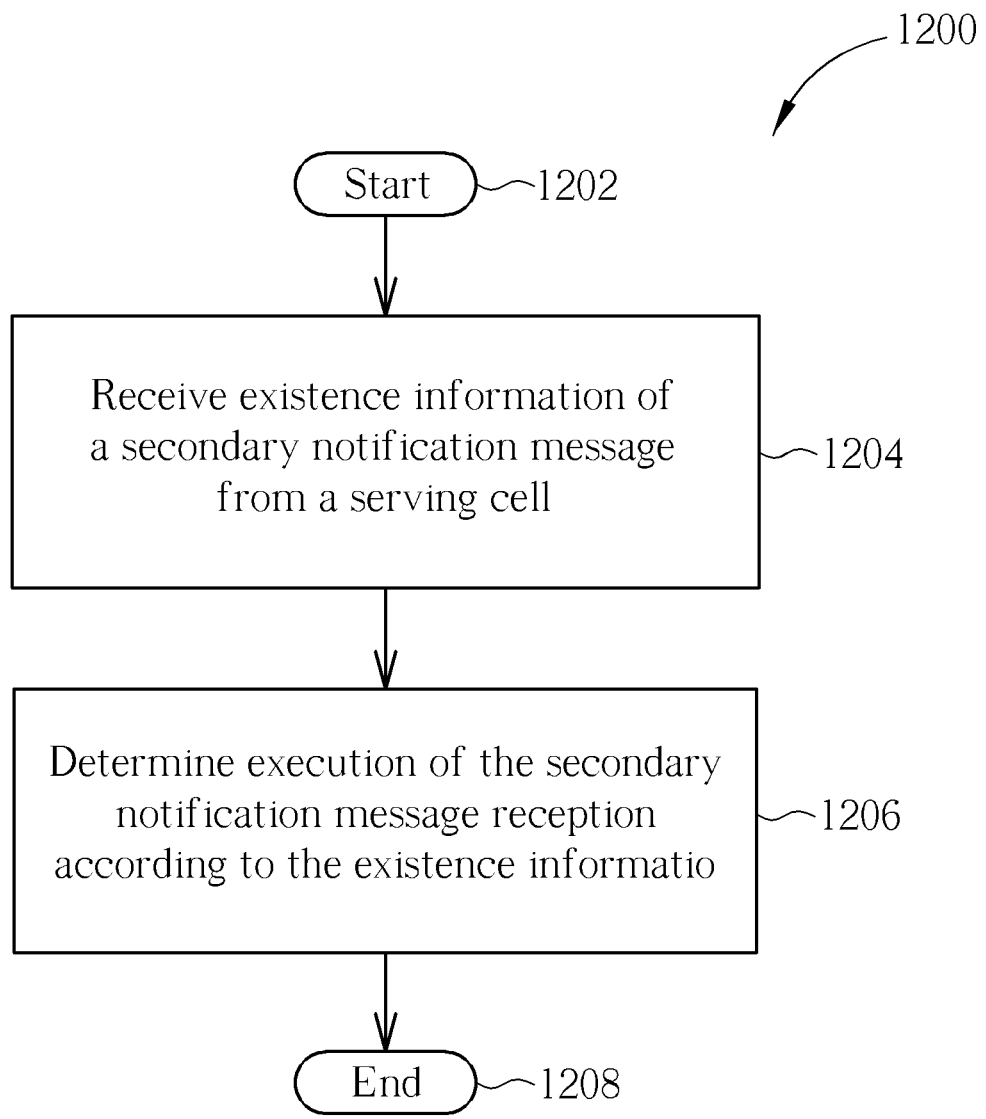
FIG. 12 is a flowchart of a process according to an embodiment of the present invention.

Please refer to FIG. 12, which illustrates a flowchart of a process 1200 according to an embodiment of the present invention. The process 1200 is utilized for managing the secondary notification message reception for a UE of a wireless communication system and can be compiled into the program code of the storage data 212. The process 1200 includes the following steps:

Step 1202: Start.

Step 1204: Receive existence information of a secondary notification message from a serving cell.

Step 1206: Determine execution of the secondary notification message reception according to the existence information.

Step 1208: End.

According to the process 1200, the serving cell sends existence information of a secondary notification message, and accordingly the UE determines execution of the secondary notification message reception according to content of the existence information after receiving the existence information.

To fit different system requirement, the ordinary skill in the art can determine what kind of existence information the serving cell sends and what way to send the existence information. For example, the serving cell can include a flag in broadcast system information. The flag is used for indicating the UE of a broadcast state of the notification message. For example, the flag set to '1' indicates that the secondary notification messages are broadcasted in the serving cell, whereas the set to '0' indicates that none of the secondary notification messages are broadcasted. The UE determines to receive the secondary notification messages when the received flag is "1", and not to execution the secondary notification message reception when the received flag is "0". In this case, the process 1200 can solve the issues 5-7 of the prior art.

Taking another example, the serving cell can include the existence information in the primary notification message. In this situation, the UE can certainly obtain the existence information before the secondary notification message reception is activated and thereby can timely control the secondary notification message reception. In this case, the process 1200 can solve the issue 8 of the prior art.

The existence information of the primary notification message can be a broadcast scope of the secondary notification message, indicating a cell-wide, routing-area-wide, location-area-wide, tracking-area-wide, or public-land-mobile-network-wide scope. With the broadcast scope information, the UE can know whether it locates within the broadcast coverage and thereby determines whether to activate the secondary notification message reception. In this case, the process 1200 can solve the issues 5 and 6 of the prior art.

Figure 13:
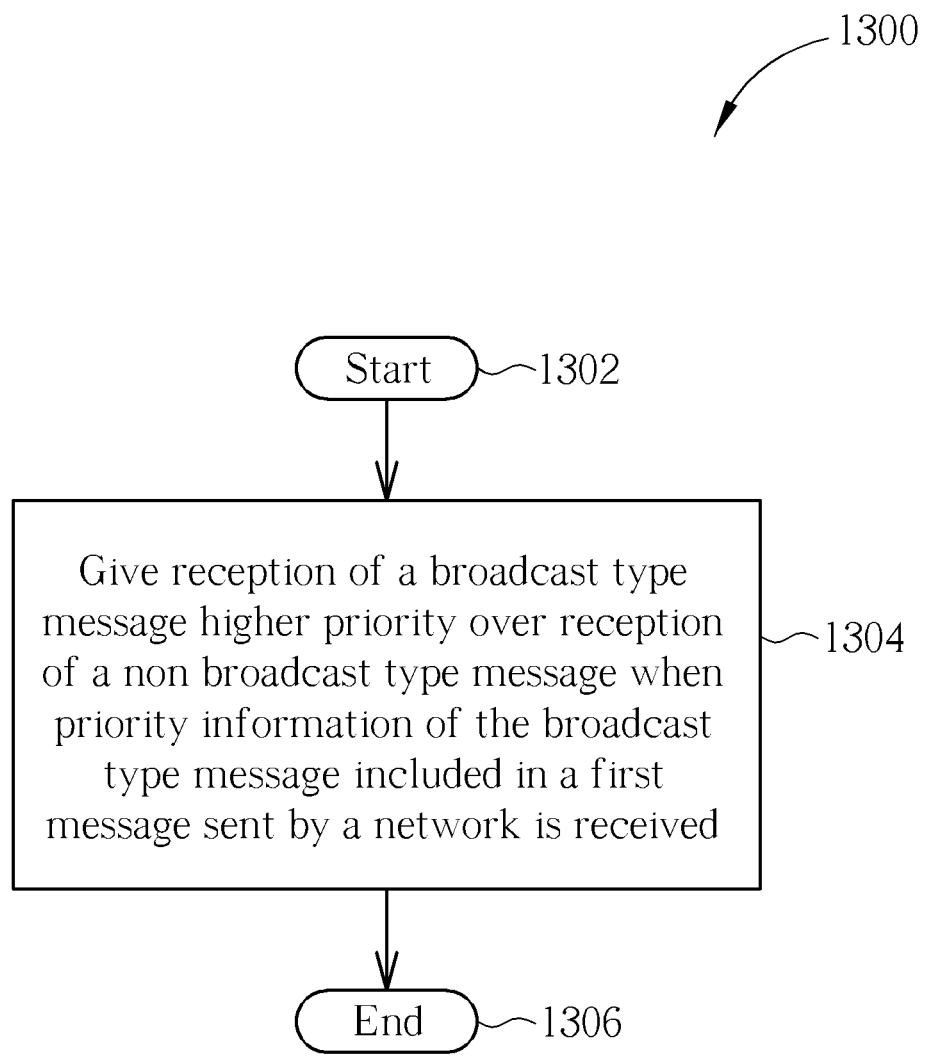
FIG. 13 is a flowchart of a process according to an embodiment of the present invention.

When the secondary notification message is transmitted in broadcast type message form, such as a cell broadcast (CB) message, the embodiment of the present invention provides reception priority program code in the storage data 212 to prevent the UE from missing the secondary notification message. Please refer to FIG. 13, which illustrates a flowchart of a process 1300 according to an embodiment of the present invention. The process 1300 is utilized for managing the secondary notification message reception for a UE of a wireless communication system and can be compiled into the reception priority program code. The process 1300 includes the following steps:

Step 1302: Start.

Step 1304: Give reception of a broadcast type message higher priority over reception of a non broadcast type message when priority information of the broadcast type message included in a first message sent by a network is received.

Step 1306: End.

According to the process 1300, the priority information of the broadcast type message is included in a first message by the network. That is, the network, through the first message, indicates the UE that the broadcast type message, used for the secondary notification message, is the most important, urgent message to receive. The UE thus gives reception of the broadcast type message higher priority over reception of any non broadcast type messages when the priority information of the first message is received. In this situation, when the broadcast and non-broadcast type messages reception collides, the UE receives the broadcast type message.

Preferably, the network uses a primary notification message as the first message. The non-broadcast type message is a paging message for the UE in the idle mode.

Therefore, the process 1300 can prevent the UE from missing the secondary notification message and can solve the issue 9 of the prior art.

Figure 14:
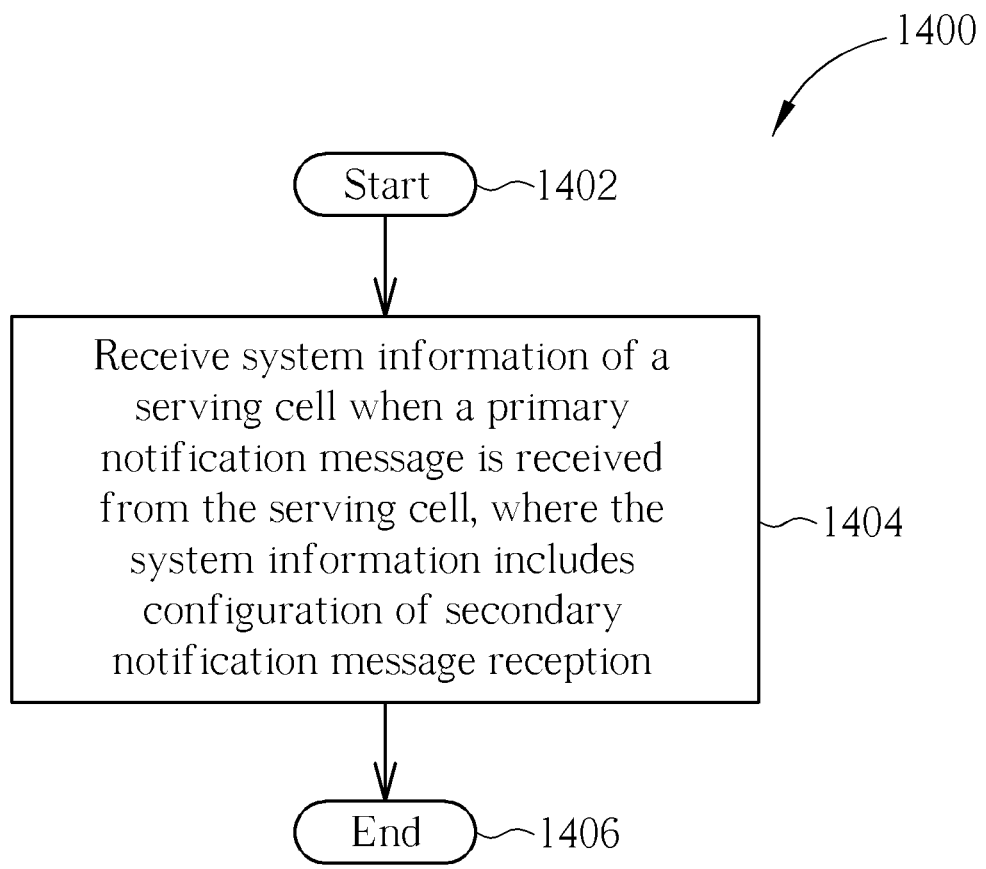
FIG. 14 is a flowchart of a process according to an embodiment of the present invention.

Please refer to FIG. 14, which illustrates a flowchart of a process 1400 according to an embodiment of the present invention. The process 1400 is utilized for managing the secondary notification message reception for a UE of a wireless communication system and can be compiled into the program code of the storage data 212. The process 1400 includes the following steps:

Step 1402: Start.

Step 1404: Receive system information of a serving cell when a primary notification message is received from the serving cell, where the system information includes configuration of secondary notification message reception.

Step 1406: End.

According to the process 1400, the UE receives system information of the serving cell when the primary notification message is received. The serving cell includes configuration of secondary notification message reception in the system information.

In the process 1400, the UE may include no configuration of the secondary notification message reception before the primary notification message is received.

Through the process 1400, the serving cell does not need to send an extra message (i.e. a system information change message) to notify the UE of the configuration of the secondary notification message. Thus, the process 1400 can solve the issue 10 of the prior art.

Figure 15:
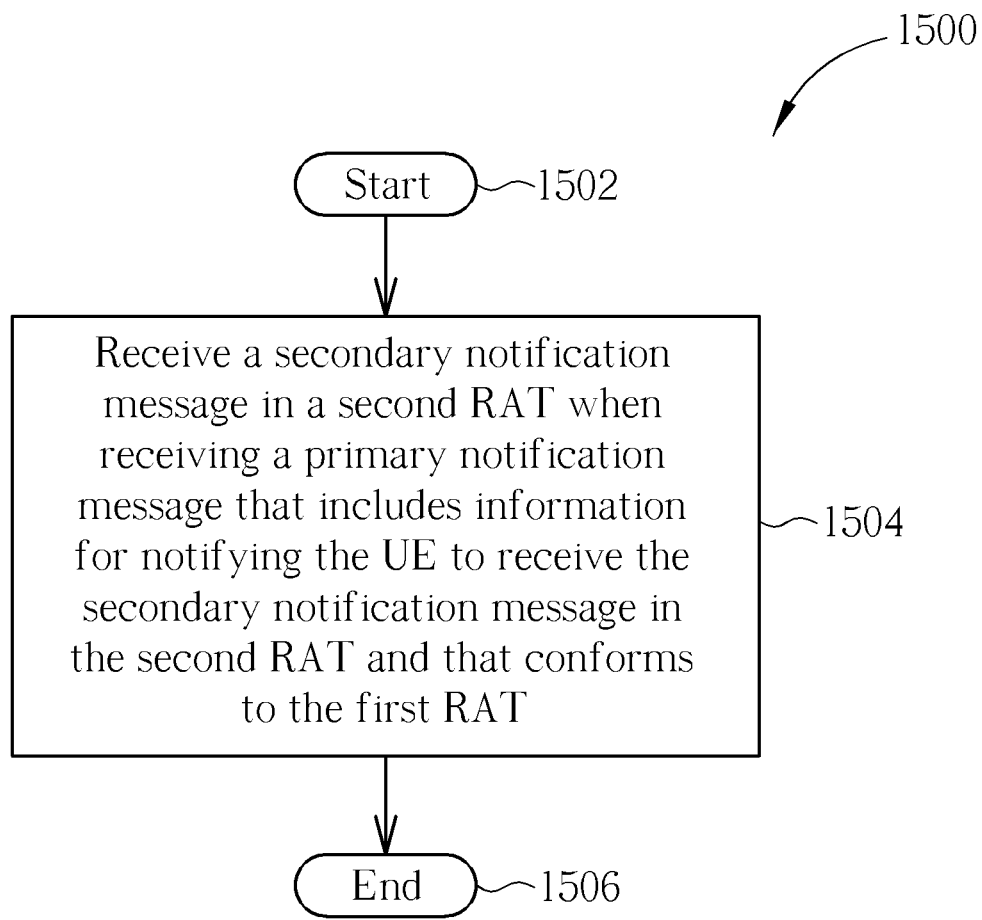
FIG. 15 is a flowchart of a process according to an embodiment of the present invention.

Please refer to FIG. 15, which illustrates a flowchart of a process 1500 according to an embodiment of the present invention. The process 1500 is utilized for managing the secondary notification message reception for a UE operating in a first RAT and can be compiled into the program code of the storage data 212. The process 1500 includes the following steps:

Step 1502: Start.

Step 1504: Receive a secondary notification message in a second RAT when receiving a primary notification message that includes information for notifying the UE to receive the secondary notification message in the second RAT and that conforms to the first RAT.

Step 1506: End.

According to the process 1500, the network with the first RAT sends the primary notification message to notify the UE operating in the first RAT to receive the secondary notification message in the second RAT, and the UE accordingly receives the secondary notification message in the second RAT when receiving the primary notification message.

Preferably, the second RAT is a GERAN or a UTRAN when the first RAT is a LTE system. In this situation, the UE in the LTE system can switch to other RAT, such as UMTS, to receive secondary notification message when the LTE system does not have enough radio resources. Thus, the process 1500 can solve the issue 11 of the prior art.

In conclusion, the embodiments of the present invention provides criteria for the UE in the ETWS to manage the secondary notification message reception according to the primary message reception, the information carried by a primary message, or the connection state of the UE to prevent the UE from wasting power on useless reception of secondary notification messages and from missing the secondary notification messages.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing notification message reception corresponding to natural disaster warning for a user equipment of a wireless communication system, the method comprising:
   activating receiving a first system information on a broadcast channel of the LTE system including a notification message when receiving a second system information broadcasted by a serving cell, when the second system information indicates that the notification message is broadcasted in the first system information by a serving cell, and the second system information also indicates that the notification message includes a resource configuration about notification message delivery from a network;
   stopping receiving the first system information including the notification message when receiving the second system information, when the second system information indicates that the notification message is not broadcasted in the first system information by the serving cell, but the second system information also indicates that the notification message does not include the resource configuration; and
   continuing receiving the first system information broadcast on the broadcast channel of the LTE system including the notification message when receiving the second system information broadcasted by the serving cell, when the second system information indicates that the notification message is broadcasted in the second system information by a serving cell, and the second system information also indicates that the notification message includes the resource configuration about the notification message delivery from the network.

2. The method of claim 1, wherein the notification message is a secondary notification message of an earthquake and tsunami warning system.

3. The method of claim 2, wherein the configuration information broadcasted by the network of the wireless communication system comprises a broadcast scope of the secondary notification message.

4. The method of claim 3, wherein the broadcast scope of the secondary notification message is a cell-wide scope, a routing-area-wide scope, a location-area-wide scope, a tracking-area-wide scope, or a public-land-mobile-network-wide scope.

5. A communication device of a wireless communication system for managing notification message reception corresponding to natural disaster warning, the communication device comprising:
   a processor for processing storage data;
   a communication interfacing unit for exchanging signals with a peer communication device of the wireless communication system; and
   a non-transitory computer readable recording medium coupled to the processor, for storing the storage data;
   wherein the storage data comprises:
   program code for activating receiving a first system information on a broadcast channel of the LTE system including a notification message when receiving a second system information broadcasted by a serving cell, when the second system information indicates that the notification message is broadcasted in the first system information by a serving cell, and the second system information also indicates that the notification message includes a resource configuration about notification message delivery from a network;
   program code for stopping receiving the first system information including the notification message when receiving the second system information, when the second system information indicates that the notification message is not broadcasted in the first system information by the serving cell, but the second system information also indicates that the notification message does not include the resource configuration; and
   program code for continuing receiving the first system information broadcast on the broadcast channel of the LTE system including the notification message when receiving the second system information broadcasted by the serving cell, when the second system information indicates that the notification message is broadcasted in the second system information by a serving cell, and the second system information also indicates that the notification message includes the resource configuration about the notification message delivery from the network.

6. The communication device of claim 5, wherein the notification message is a secondary notification message of an earthquake and tsunami warning system.

7. The communication device of claim 6, wherein the configuration information broadcasted by the network of the wireless communication system comprises a broadcast scope of the secondary notification message.

8. The communication device of claim 7, wherein the broadcast scope of the secondary notification message is a cell-wide scope, a routing-area-wide scope, a location-area-wide scope, a tracking-area-wide scope, or a public-land-mobile-network-wide scope.

* * * * *